United States Patent [19]

Hahn

[11] 4,054,701
[45] Oct. 18, 1977

[54] PLASTIC SHEET WITH A SURFACE TREATED TO ENHANCE ADHESION AND METHOD OF MAKING SUCH SHEETS

[75] Inventor: Alvin J. Hahn, Ladoga, Ind.

[73] Assignee: R. R. Donnelley & Sons Company, Chicago, Ill.

[21] Appl. No.: 662,862

[22] Filed: Mar. 1, 1976

[51] Int. Cl.² .................. B32B 3/00; B42D 3/02; B29C 3/00
[52] U.S. Cl. .................. 428/156; 264/284; 264/293; 264/299; 281/21 R; 281/29; 428/179; 428/476; 428/477; 428/478; 428/513
[58] Field of Search .............. 428/156, 179, 477, 478, 428/476, 513; 264/299, 293, 284; 281/29, 21 R

[56] References Cited

U.S. PATENT DOCUMENTS

| | | | |
|---|---|---|---|
| 3,575,764 | 4/1971 | McFarren | 428/156 |
| 3,810,812 | 5/1974 | Koenig | 428/202 |
| 3,956,450 | 5/1976 | Abe | 264/284 |
| 3,962,066 | 6/1976 | Barber | 428/156 |

Primary Examiner—Ellis Robinson
Attorney, Agent, or Firm—Wegner, Stellman, McCord, Wiles & Wood

[57] ABSTRACT

A sheet of thermoplastic material has a planar surface treated to enhance adhesion of paper thereto by means of an adhesive of the class consisting of animal glue and water base adhesives as used in book binding. The sheet is passed beneath a heated diamond knurling roll at a temperature and pressure, and at a rate to produce a dwell time, which are controlled to form in said planar surface a continuous pattern of small, shallow recesses separated by inter-recess planar areas of said surface, and a raised rim of the thermoplastic material bordering each of said recesses and projecting above the planar areas, a large percentage of said rims having at least a part of their outer periphery overhanging a portion of the adjacent inter-recess planar area.

10 Claims, 5 Drawing Figures

PLASTIC SHEET WITH A SURFACE TREATED TO ENHANCE ADHESION AND METHOD OF MAKING SUCH SHEETS

BACKGROUND OF THE INVENTION

Several proposals have been made to reduce the relatively high cost of producing the cases which are used in book binding. In approximately the last dozen years various proposals have been made for making book cases from plastic which permits them to be made in one piece and thus reduces the cost.

A principal difficulty in the manufacture of cased books using plastic cases is that the plastic materials having properties which make them most desirable for this purpose have surfaces to which the paper liners used in cased books cannot be adhered by means of animal glue or water base adhesives which are commonly used in book binding.

U.S. Pat. No. 3,088,753 relates to a plastic book cover of a non-stretchable synthetic polymer which is formed in a mold. The patent states in part "A layer of paper 56 is shown bonded to the inside of each panel of the cover. This paper may be heat-sealed to the plastic cover by applying the paper while the plastic is still sticky in the mold. . . ."

"If the paper 56 is not applied to the cover while the cover is still in a sticky condition in the mold, an adhesive must be used. Most adhesives are not suitable for this purpose. . . . Latex base adhesives have been satisfactory in practice, . . ."

U.S. Pat. No. 3,532,363 relates to bonding the rear edges of the pages of a book to the backbone of a plastic cover, and describes the use of an intermediate hot melt adhesive strip for this purpose, or alternatively a plastic material which is a good adhesive for paper.

Neither of the foregoing prior art patents discloses any way of adhering the end sheets of a book to the inner surfaces of plastic case front and back panels with the ordinary adhesives used in book binding; and in fact U.S. Pat. No. 3,088,753 states that such adhesives are not satisfactory for the purpose.

SUMMARY OF THE INVENTION

In accordance with the present invention a sheet of thermoplastic material has one surface treated to enhance adhesion of paper thereto by means of an adhesive of the class consisting of animal glue and water base adhesives as used in book binding. Both the sheet with its treated planar surface and the method of producing the surface are novel.

The method consists in subjecting the surface to pressure from a heated member such, for example, as a diamond knurled roller, with the temperature, pressure and dwell time being so regulated that the knurls penetrate the surface of the plastic sheet to less than their full depth, so that there are clear, planar areas between the craters formed by the knurls. The material pushed out of each crater forms a substantially continuous lip around the crater and a large part of each such lip overhangs the planar surface between the lip and the next adjacent crater and lip.

When adhesive is applied to such a surface, it extends beneath the overhanging lips which thus afford means providing a strong bond between the treated surface of the plastic sheet and the adhesive for securing the book end sheets thereto.

The roll temperature, pressure and dwell time for various types of plastic materials to produce the required surface configuration can be easily determined by experimentation. The present disclosure includes the apparatus and operating conditions for practicing the invention with book cases of polyethylene.

After the above described surface treatment, the surface may be made still more adherent to adhesives by additional conventional steps including a corona discharge treatment and the application of a low viscosity priming material.

THE DRAWINGS

DETAILED DESCRIPTION OF THE INVENTION

Figure 1:
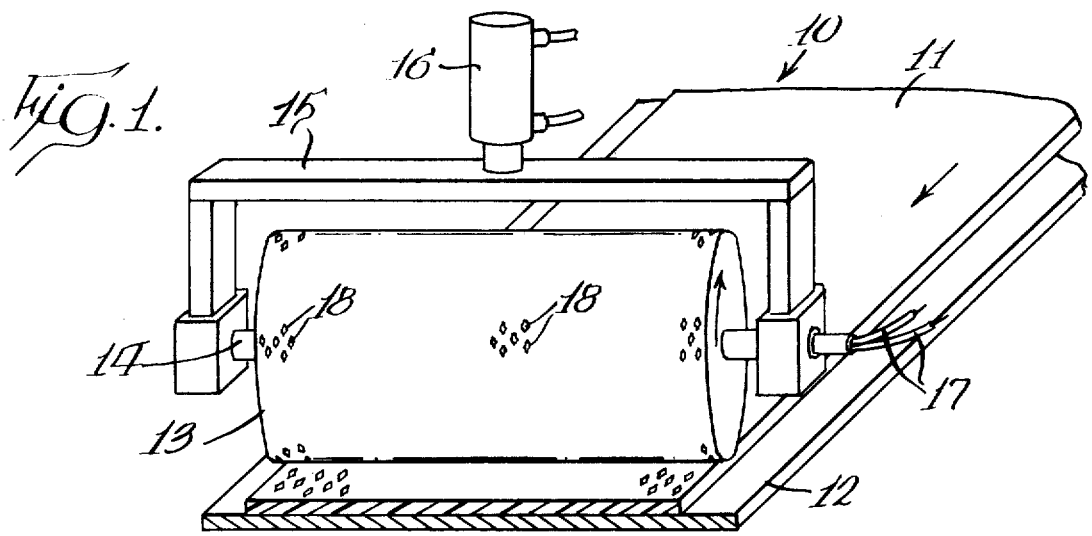
FIG. 1 is a schematic, perspective view of suitable apparatus for carrying out the method of the present invention.
Figure 2:
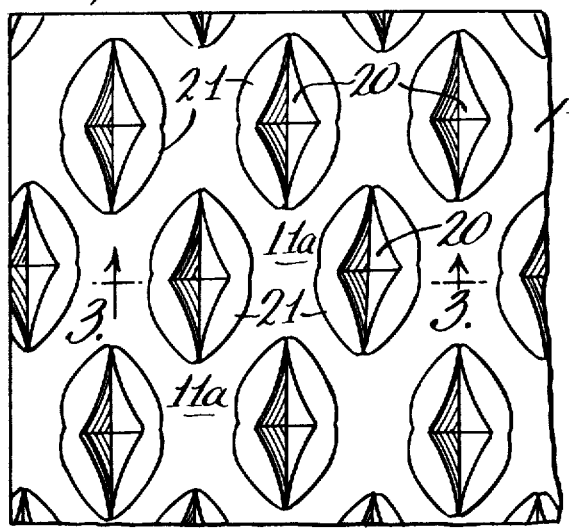
FIG. 2 is a plan view on a greatly enlarged scale of a portion of the surface of a plastic sheet after it has been treated in accordance with the method.
Figure 3:
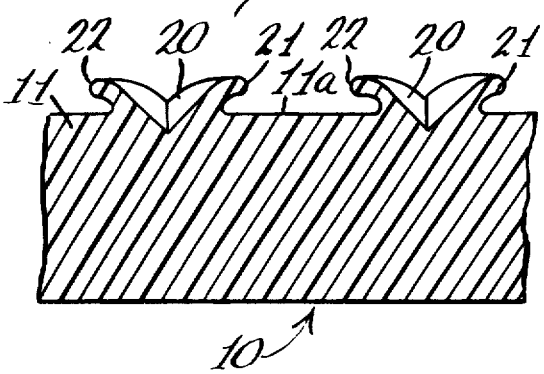
FIG. 3 is a fragmentary sectional view taken substantially as indicated along the line 3—3 of FIG. 2.

Referring first to FIGS. 1 to 3, a sheet 10 of thermoplastic material may be of any type which is suitable for use as a one-piece case for books. Polyethylene sheet which is about one-sixteenth inch thick, or polyallomer, or polyolefin, or polypropylene are all satisfactory for the purpose, as are other thermoplastic materials which are sufficiently tough and rigid in approximately that thickness, and which can provide good hinges in thinner sections. For best results, a book cover is formed with a thinned backbone area as taught in U.S. Pat. No. 1,447,731.

The sheet 10 has a planar surface 11 which is uppermost in the drawings and which is the inner surface when the sheet is used in the binding of a book when the book end sheets must be adhered to that surface. The adhesives commonly used in bookbinding include animal glue and water base adhesives, none of which form a good bond with the surface of a sheet of thermoplastic material of the type required for a book case unless the surface has been treated to enhance the bonding of the adhesive to it.

In accordance with the present invention, the plastic sheet which is to be used in the forming of a case for a book is carried on a conveyor belt 12 beneath a heated member 13 which takes the form of a roller that is journalled at 14 in a vertically movable supporting frame 15 which may be moved vertically by a hydraulic piston means 16 so that the roller 13 may be brought into contact with the surface 11 of the plastic sheet 10 at a controlled pressure. The roller 13 is provided with internally mounted, electrical heating means (not shown) which is connected by wires 17 to a source of electric power. The circuit for the electrical heating means includes the usual means for adjusting the roller temperature to a desired level, and the usual thermostatic switch for maintaining temperature at the selected level.

The roller 13 is provided with a continuous pattern of small, closely adjacent protuberances 18 which may take a number of different forms but which, in the particular apparatus shown, are diamond shaped knurls 0.06 inch high and with about 1280 knurls per square inch.

When the plastic sheet 10 is moved forwardly beneath the roll 13 as indicated by the arrow in FIG. 1, the roll temperature, the contact pressure exerted by the roll, and the speed of the sheet are controlled to produce the desired treatment of the surface 11. Where the protuberances 18 are diamond knurls as heretofore described, the planar surface 11 of the sheet is provided with a continuous pattern as illustrated in FIGS. 2 and 3 of the drawings. In the surface treatment, the heated roller softens the surface 11 of the sheet so that the knurls 18 are pressed into it by the contact pressure established by the hydraulic cylinder 16, and the protuberances displace the plastic material to form recesses 20, with the displaced thermoplastic material being pushed upwardly and outwardly into a rim 21 which projects above the planar surface 11 and borders the recess. The treatment leaves inter-recess planar areas which are indicated by the numeral 11a in FIGS. 2 and 3, and a large percentage of the rims 21 have at least a part of their outer periphery 22 overhanging the inter-recess planar areas 11a as clearly seen in FIG. 3. The overhanging peripheral portions 22 provide means beneath which adhesive may interlock so as to form an excellent bond between the sheet 10 and a piece of paper which is secured by means of an adhesive such as animal glue or the water base adhesives which are commonly used in bookbinding.

In practicing the method to give the desired surface configuration to a sheet of polyethylene, the roller is run at a temperature of 400° F. to 425° F., the piston 16 presses the roller 13 against the surface 11 under a pressure of about 435 pounds per square inch of surface, and the sheet is moved at 29 feet per minute which gives a dwell time under the roller of about 0.16 seconds for any particular point on the surface 11.

The particular processing conditions cause the knurls to be pressed into the surface 11 without permitting the spaces between the knurls to bear upon the displaced thermoplastic material which has been forced out in the shape of the rims 11. Thus, it is apparent that the total depth of each of the recesses 20 from the top of the rim 21 must be less than the 0.06 height of the knurls.

Figure 4:
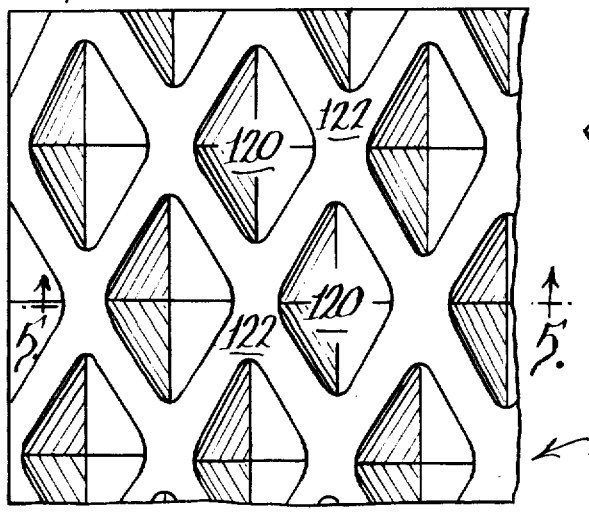
FIG. 4 is a plan view of an incorrectly treated surface in which one or more of the temperature, pressure, and dwell time was excessive.
Figure 5:
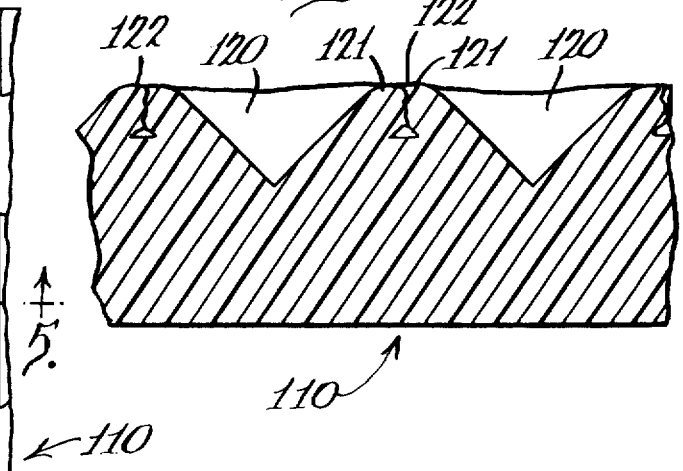
FIG. 5 is a fragmentary sectional view taken substantially as indicated along the line 5—5 of FIG. 4.

FIGS. 4 and 5 of the drawings show the nature of the surface which is produced in a plastic sheet 110 if any one or more of the temperature, the pressure, and the dwell time is excessive. In that case, the knurls penetrate the surface more deeply to form recesses such as the recesses 120; this displaces more plastic as indicated at 121 in FIG. 5, and the surface of the roller between the knurls bears upon the displaced plastic 121 to push the rims together into a substantially continuous surface 122 which comletely fills the space between the recesses 120. The difference between the correct surface configuration illustrated in FIGS. 2 and 3 and the incorrect surface configuration of FIGS. 4 and 5 may be seen with the naked eye, and is very plain under even a low power magnifying glass.

Accordingly, the proper combination of temperature, pressure and dwell time for thermoplastic materials other than polyethylene may be readily determined by simple experimentation and optical examination with a low power magnifying glass.

It is quite apparent that surface patterns other than those illustrated in FIGS. 2 and 3 will produce a satisfactory result provided the rims with overhanging periphery are present. For example, conical knurls or pyramidal knurls or narrow closely spaced, shallow V-shaped ribs on the roller 13 can produce the desired surface configuration, provided the coordinated restrictions of temperature, pressure and dwell time are maintained.

A diamond knurled roller produces recesses which may best be described as craters, and each crater with its surrounding rim is generally oval, as shown, with a long dimension of about 0.3125 inch and a short dimension of about .02 inch. In practice, the rims are not quite as uniform as illustrated in the drawings, nor do the overhangs 22 necessarily extend continuously in the precise form illustrated in FIG. 3. However, satisfactory adhesion is obtained if a large percentage of the rims 21 have at least a part of their outer periphery 22 overhanging the inter-recess planar areas 11a.

The foregoing detailed description is given for clearness of understanding only and no unnecessary limitations should be understood therefrom, as modifications will be obvious to those skilled in the art.

I claim

1. A sheet of thermoplastic material which has had a planar surface treated to enhance adherence of paper thereto by means of an adhesive of the class consisting of animal glues and water base adhesives, said surface being characterized by a continuous pattern of small, shallow recesses separated by inter-recess planar areas of said surface, and a raised rim of the thermoplasitc material bordering each of said recesses and projecting above the planar areas, a large percentage of said rims having at least a part of their outer periphery overhanging a portion of the adjacent inter-recess planar area.

2. The sheet of claim 1 in which each recess takes the form of a small crater, and each rim extends substantially continuously around the crater that is bordered by it.

3. The sheet of claim 2 in which the craters are essentially of a diamond shape with sloping sides.

4. The sheet of claim 2 in which there are about 320 craters per square inch, and each crater and rim is generally oval with a long dimension of about 0.03125 inch and a short dimension of about 0.02 inch.

5. The sheet of claim 1 which consists of polyethylene.

6. A method of treating a planar surface of a sheet of thermoplastic material to enhance adherence of paper thereto by an adhesive of the class consisting of animal glues and water base adhesives, said method comprising the step of subjecting said planar surface to contact under pressure from a heated member which has a continuous pattern of small, closely adjacent protuberances that displace the thermoplastic material to form in the planar surface a continuous pattern of small recesses, and controlling the temperature of said member, the pressure, and the time of contact so that said recesses are shallow and separated by small inter-recess planar areas, and so that the thermoplastic material displaced to form each recess remains as a raised rim which borders said recess and has at least a part of its outer periphery overhanging a portion of the adjacent inter-recess planar area.

7. The method of claim 6 in which the protuberances on the heated member form small craters in the planar surface of the thermoplastic sheet.

8. The method of claim 6 in which the thermoplastic material is polyethylene, the heated member is at a temperature in the range of 400° F. to 425° F., and said heated member is pressed onto the planar surface for about 0.016 seconds at a pressure of about 435 pounds per square inch of said surface.

9. The method of claim 8 in which the heated member rolls in contact with the planar surface at a rate of about 29 feet per minute.

10. The method of claim 9 in which the protuberances on the heated member form small craters in the surface of the sheet of thermoplastic material.

* * * * *